June 20, 1967  P. BASS  3,327,051
SUBSCRIPTION ENTERTAINMENT SYSTEMS
Filed Sept. 9, 1963  3 Sheets-Sheet 1

INVENTOR
Patrick Bass
BY
ATTORNEY.

INVENTOR
Patrick Bass
ATTORNEY

United States Patent Office 3,327,051
Patented June 20, 1967

3,327,051
SUBSCRIPTION ENTERTAINMENT SYSTEMS
Patrick Bass, London, England, assignor to
R. & R. Research Limited
Filed Sept. 9, 1963, Ser. No. 307,475
Claims priority, application Great Britain, Sept. 21, 1962,
35,983/62
12 Claims. (Cl. 178—5.1)

This invention relates to subscription entertainment systems of the prepayment type, that is, systems in which a subscriber's apparatus will reproduce entertainment programmes only against a payment or the equivalent of a payment, such as the recording of a debit.

The payment or debit may be in respect of previous, present or subsequent programme or programmes, but in any case must be made or recorded to reproduce the next programme.

A usual feature in such systems is means to register in a subscriber's apparatus the price which he will be charged to receive a selected programme. In certain known subscription entertainment systems the price to be charged for each programme is denoted by a signal transmitted from the central station to all subscribers. This signal consists of a train of impulses, the number of impulses contained in the train being directly related to the price of the programme. At each subscriber's position the pulse train is applied to a ratchet relay or stepping motor arranged to control the operation of a price indicator or a price register.

According to one aspect of the present invention there is provided a subscription entertainment system comprising means to transmit to a subscriber a control signal containing two events temporally separted by an interval determined by the designated price of a programme, and receiver apparatus at the subscriber's position comprising means to reproduce entertainment programmes, means including a synchronous or constant speed motor and responsive to the said interval to register the said price, and control means to inhibit the reproduction of programmes until a manual acceptance control has been operated, permitting the registered price to be debited.

According to another aspect of the invention, there is provided a subscription entertainment system receiver apparatus comprising means to reproduce entertainment programmes, means to apply a received pricing signal, containing two events temporally separated by an interval determined by the designated price of a programme, to cause a price-registering member to be driven via a synchronous or constant speed motor during the said interval to register the said price, and control means to inhibit the reproduction of programmes until a manual acceptance control has been operated, permitting the said price to be debited.

The subscriber's apparatus may include an indexing device operative upon said price-registering member to provide stable positions for said member only at positions directly registering prices which are integral multiples of a predetermined minimum unit.

The mode of operation of a subscription entertainment system according to the invention may be varied according to the specific operational requirements. Depending on the mode of operation required, the price control signal may be transmitted once only for each programme, either before, during or after the programme, or, alternatively, the signal may be repeated from time to time during the programme. Where the signal is repeated it will be necessary to provide a logic circuit for the subscriber's terminal equipment so that the equipment responds to one price control signal only from the series.

In one convenient embodiment of subscriber's apparatus suitable for use in a subscription entertainment system according to the invention the constant-speed motor comprises a self-starting synchronous motor to which a current supply is fed from the alternating-current mains during the interval between said events in said signal.

In one embodiment of the invention the subscriber's apparatus includes means operating upon the subscriber actuating a mechanical control to signify his acceptance of the offered programme whereby reverse rotation of said price-registering member is effected simultaneously with the establishment of a debit charge. This may be done by advancing the count on a meter.

In an alternative embodiment of the invention the acceptance of a programme is ineffective in the absence of a sufficient previously-established credit representing the unexpended value of coins deposited in a coinbox. In the presence of such a credit the operation of accepting a programme may cause reverse rotation of the price-registering member together with movement of a further member such as to reduce by the registered price of the programme the credit previously established.

The invention will now be further described with reference to the accompanying drawings, comprising FIGURES 1 to 5 of which:

Figure 1:
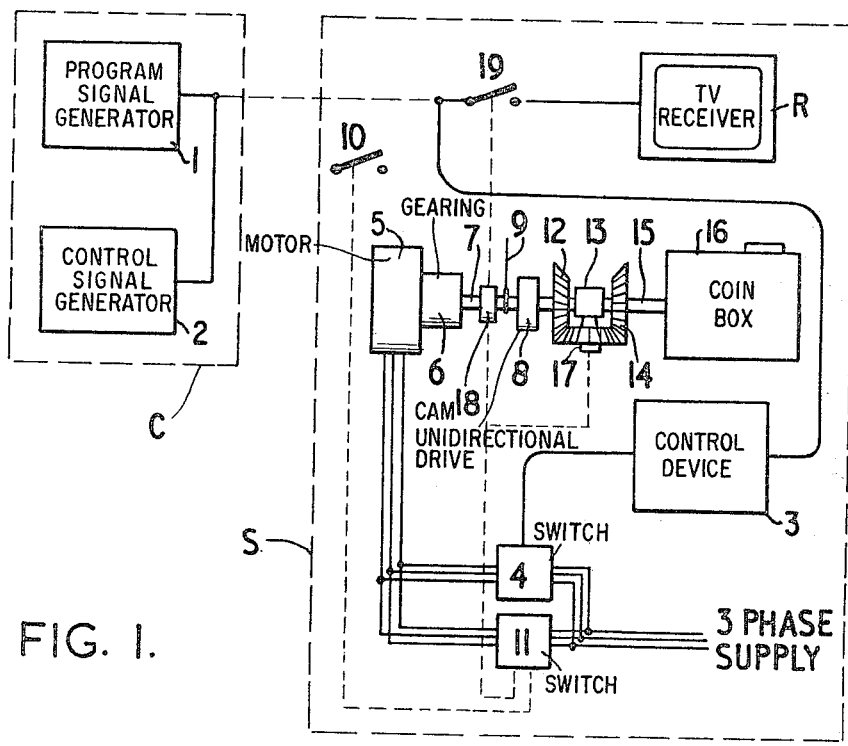
FIGURE 1 is a schematic diagram illustrating one embodiment of subscription entertainment system according to the present invention.

FIGURE 1 gives a block schematic diagram of one embodiment of subscription entertainment system according to the invention. A central station of the system represented by the space within broken line C contains means 1 for generating a signal representative of a programme of entertainment, which may be a sound or a television programme. Central station C also comprises a device 2 for generating a control signal containing two events separated by a predetermined interval of time, variable as required. The apparatus at a single subscriber's position is represented as enclosed by a broken line S and comprises a device 3 responsive to the events contained in the control signal generated by device 2 to close a switch device 4 during the interval between these events. When switch device 4 is closed it connects a synchronous motor 5 to a three-phase supply. Alternatively, any other form of constant speed motor could be caused to operate during the interval. Motor 5 therefore revolves and, through the intermediary of suitable reduction gearing contained in a casing 6, drives an output shaft 7, which is initially in a predetermined position attained as described later, through an angle proportional to the duration of the interval between the two events in the control signal. To output shaft 7 is connected one element of a unidirectional drive device 8 such that it does not transmit motion in the direction in which motor 5 is now rotating. Shaft 7 is thus turned through an angle representing the price to be paid for the proffered programme. An indication of this price is displayed to the subscriber in this embodiment by a pointer 9 secured to shaft 7 and moving over a scale (not shown). Alternatively, price display or announcement may be by other means.

If the subscriber decides to accept the proffered programme he operates a manually operated switch 10, thus intiating the operation of a switching device 11 which allows 3-phase current to be again supplied to motor 5. In this case, however, the phase connections differ, so that motor 5 rotates in the reverse direction and, by way of unidirectional drive device 8 drives one input gear 12 of a differential device 13. The other input gear 14 of device 13 is rotated by the output shaft 15 of coin box 16 by an angle proportional to the value of coins deposited therein. The position of the output gear 17 of differential device 13 is thus dependent upon the difference between the settings of the pricing gear 12 and the credit gear 14. If the resulting position of output gear 17 of differential device 13 is such as to denote a credit status, that is, provided that the price charged for the programme has not exceeded the credit previously established by the insertion of coins into coinbox 16, the programme signal will then pass to a reproducer R.

Motor 5 continues to run until switch device 11 is opened by the action of a cam 18 mounted upon shaft 7, contacts associated with which cause switch device 11 to open when shaft 7 reaches the initial position indicating "PAID" and at the same time close a contact 19 which allows programme signals to pass from transmitter 1 to reproduce R. If, however, the registered credit is exhaused before the required price has been paid, a cam device operated by output gear 17 of differential device 13 intervenes to stop motor 5, so that pointer 9 will indicate the unpaid portion of the programme price.

Figure 2:
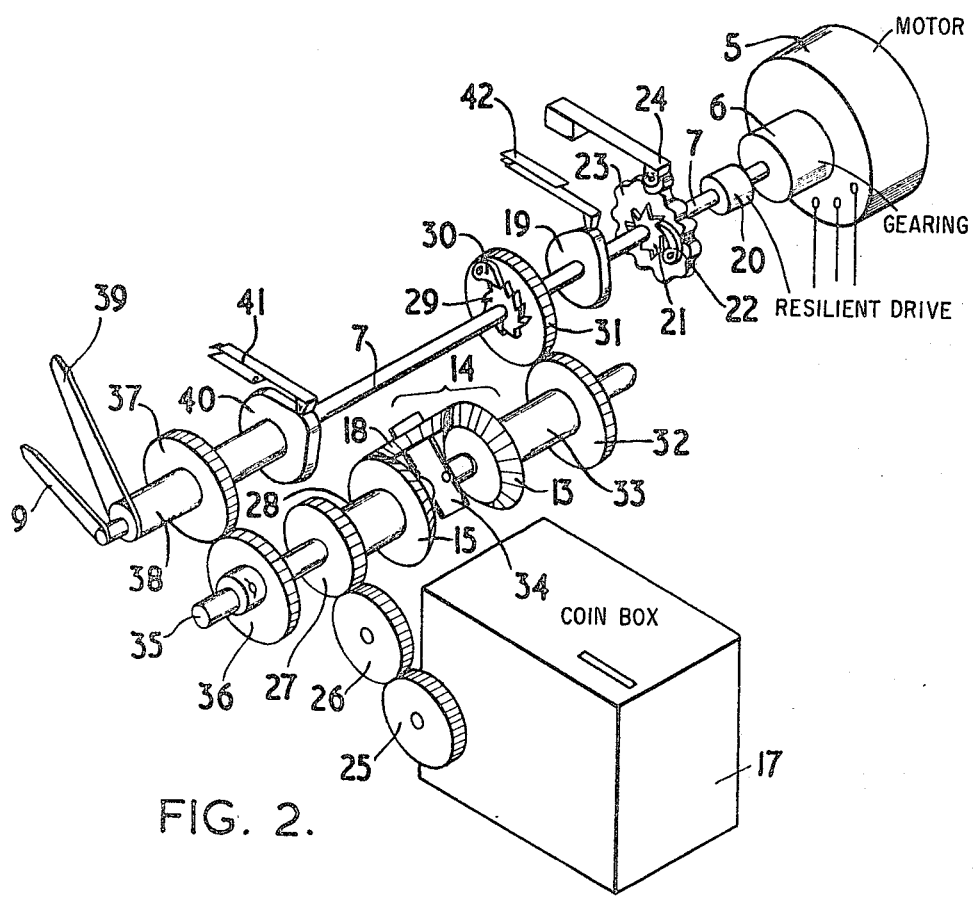
FIGURE 2 is a simplified diagram illustrating one embodiment of credit and price establishing mechanism suitable for use in a subscription entertainment system according to the invention.

FIGURE 2 shows the essential elements of another embodiment working on similar principles to that referred to in FIGURE 1 and possessing additional advantageous features not previously described. In the mechanism shown in FIGURE 2 a motor 5 having an output geared-down by conventional gearing contained in a casing 6 drives an output shaft 7 by way of a resilient drive 20. Shaft 7 carries a ratchet wheel 21 which is engaged by a pawl 22 carried on an indented, generally disc-like member 23 which cooperates with a spring loaded roller device 24 to provide a plurality of equally-spaced stable positions for shaft 7. Thus as shaft 7 is driven by motor 5 in a clockwise direction it is advanced in a series of "clicks" from one stable position to the next. Each of these stable positions will correspond to a given programme price which is an integral multiple of a minimum price.

The end of shaft 7 remote from the click device described above carries a pointer 9 arranged to move over a scale-plate (not shown) upon which the possible programme prices are indicated.

To establish credit, coins are inserted in a coinbox mechanism 17 of known type, the output shaft of which carries a gear wheel 25 which by way of an idler gear 26 rotates a further gear 27, thus rotating a sleeve 28 upon which is also mounted the credit input gear 15 of differential device 14.

When a proffered programme has been accepted, as described in relation to FIGURE 1, motor 5 rotates in the anticlockwise direction. Ratchet 21 does not now engage pawl, 22 so that the click mechansim is disabled. However, a further ratchet wheel 29 now engages a pawl 30 mounted on a gear-wheel 31 which is thus rotated and by way of a meshing gear wheel 32 and a sleeve 33 turns the price input gear 13 of differential device 14. It will be appreciated that ratchet 29 and pawl 30 correspond functionally to the unidirectional drive device 8 of FIGURE 1. The output gear 18 of differential device 14 is carried on a stub 34 secured to a shaft 35 to which is also secured a gear wheel 36. Gear 36 meshes with a further gear 37 carried on a sleeve 38 upon which is also mounted a pointer 39 moving over a scale (not shown) indicating the credit state of the mechanism. If after a programme has been accepted the registered credit is exhausted before all the programme price has been debited, so that the credit pointer 39 reaches its zero position, then a cam 40 carried on sleeve 38 will operate contacts 41 which are arranged to stop motor 5. When this occurs pointer 9 will indicate the amount of the programme price still unpaid and cam 19 on shaft 7 will not move to that position in which contacts 42 which are operated by cam 19 complete the path of the programme signal and stop motor 5. Pointer 39 will now be at the "zero credit" position while pointer 9 will indicate the unpaid amount of programme charge. The insertion of coins to this amount in the coinbox will allow the normal operation of the mechanism to be completed to permit the selected programme to be reproduced.

Figure 3:
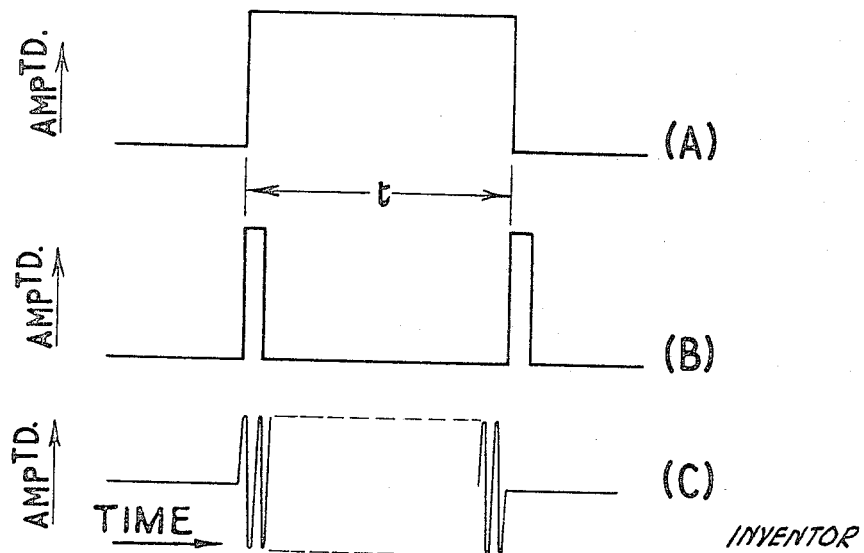
FIGURE 3 represent alternative forms of control signal which may be used in operating a subscription entertainment system according to the invention.

FIGURE 3 shows alternative forms of control signal which may be transmitted from generator 2 to device 3 at the subscriber's position. The diagram A illustrates a continuous pulse of duration $t$, the two events thus provided being the rising and falling edges respectively of the pulse. Diagram B shows a signal comprising two brief pulses of which the leading edges are separated by the required interval $t$. In an alternative arrangement illustrated in FIGURE 4 and by FIGURE 3C which is applicable only to systems in which a central station is connected to subscribers' stations by cables, the need to separate the control signals from the programme signals may be obviated by transmitting as the control signal an apropriate number of cycles of a mains-frequency sinusoidal voltage adequate to drive the motor in the price-setting direction.

Figure 4:
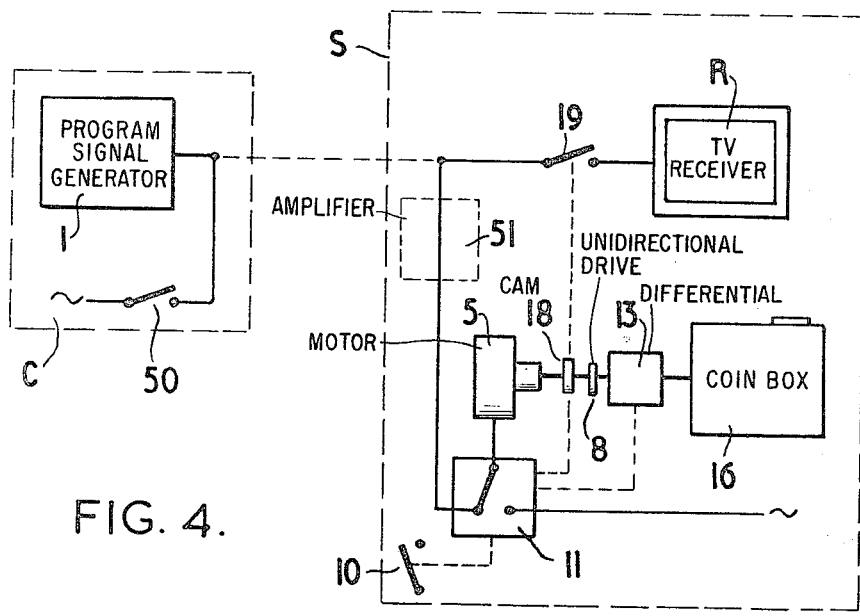
FIGURE 4 is a simplified diagram illustrating an alternative embodiment of credit mechanism and FIGURE 5 is a diagram illustrating an additional device for use with arrangements according to the invention.

In FIGURE 4 the device 2 of FIGURE 1 is replaced by a simple switch device 50 arranged by suitable conventional means (not shown) to apply a means-frequency voltage to the distribution network. At the subscriber's position the motor 5 is normally connected to the disribution network by switch device 11, possibly with the intervention of an amplifier 51 so that the mains-frequency signal transmitted when switch 50 at the central station is closed causes the appropriate price to be displayed. To ensure that the correct price is in fact given whatever the mains frequency it may be arranged that the period during which switch 50 is closed is controlled by a mechanism driven by a similar motor.

Figure 5:
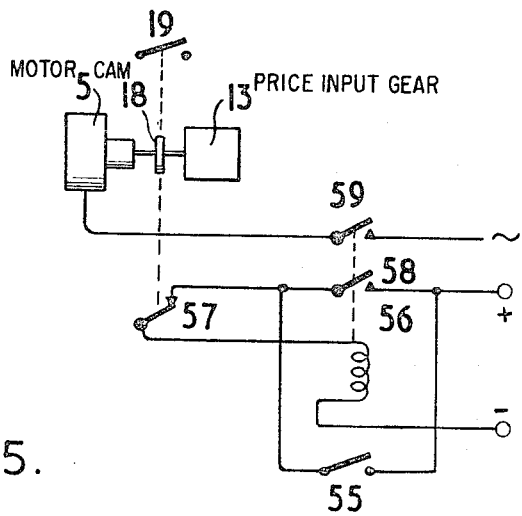

The equipment as thus far described contains no provision for restoring the price indicating member to its initial position when the proffered programme is not accepted by the subscriber. This operation may be performed in one of a number of ways. For example, at or shortly before the end of a programme, or before a price change during a programme, the motor 5 may be driven by a further control signal so as to complete a revolution and thus attain the zero position. Alternatively means may be provided which, when the subscriber's equipment is switched off and on again, or when it is switched from one programme to another available at the same time, or when a price change is to be made, causes the motor to be driven by local mains current so as to "home" to the zero position. Such an arrangement is shown in FIGURE 5, where any of the events mentioned causes a contact 55 to close, thus establishing an operating circuit for a relay 56 from the + terminal of a direct-current supply, contact 55, a contact 57 operated by cam 18 on the motor output shaft and the relay coil to the − terminal of the supply. A hold contact 58 of relay 56 maintains the operating circuit when contact 55 opens. Further contacts of relay 56, of which one only is shown at 59, feed local mains-frequency current to motor 5 which thus runs in the forward direction until at the zero price position cam 19 opens contact 57, thus releasing relay 56 and stopping the motor.

Although the apparatus specifically described above requires a credit to be established by the deposition of coins in a coinbox it will be apparent that this arrangement may be modified by arranging that when a subscriber accepts a programme the reverse movement of the price-indicating member is transferred through a ratchet drive to a shaft operating a debit meter, which thus totals the values of all programmes accepted over a given period. In an alternative, similar arrangement the debit meter could be driven directly by the pricing motor, which would be arranged to operate from the price-control signal only when a programme had been accepted.

A further modification of the arrangements described above would be to replace the synchronous electric motor by a constant-speed motor, either electric or clockwork, which is started and stopped by the two events of the control signal.

In yet another modification of the arrangements already described and synchronous motor is arranged to be driven by the field synchronising impulses of a television signal forming said entertainment programme, or by a signal derived from these synchronising impulses. It would also be possible to develop a motor-driving signal by frequency division of the line synchronising impulses. The advantage of this modification lies in the great accuracy of frequency and phase of the synchronising components of the television signal, which often greatly exceed those of the supply mains.

The expression "entertainment" used throughout this specification and the appended claims is to be interpreted as including news, discussions, educational features or any other information items intended for subscribers on their electing to pay the designated fees.

What is claimed is:

1. A subscription entertainment system comprising means to transmit to a subscriber a control signal containing two events temporally separated by an interval indicative of the designated price of a programme, and receiver apparatus at the subscriber's position comprising means to reproduce entertainment programmes, means including a synchronous or constant speed motor and responsive to the said interval to register the said price, and control means to inhibit the reproduction of programmes until a manual acceptance control has been operated, permitting the registered price to be debited.

2. A system according to claim 1 wherein on acceptance, the motor direction is reversed, whereon the registered price is subtracted from a credit state indication via a differential means.

3. A system according to claim 1 wherein the two events are the rise and fall of a single pulse.

4. A system according to claim 1 wherein the two events are corresponding edges of two respective similar pulses.

5. A system according to claim 1 in which the two events are the beginning and end of a transmission of mains electricity supply to the subscriber, either to drive his motor directly or to control the energisation of it.

6. A subscription entertainment system receiver apparatus comprising means to reproduce entertainment programmes, means to apply a received pricing signal, containing two events temporally separated by an interval determined by the designated price of a programme, to cause a price-registering member to be driven via a synchronous or constant speed motor during the said interval to register the said price, and control means to inhibit the reproduction of programmes until a manual acceptance control has been operated, permitting the said price to be debited.

7. An apparatus according to claim 6 wherein the operation of the manual acceptance control causes rotation of the motor in the opposite sense to its rotation during the said interval, whereon a credit-indicating member is moved to reduce the credit indication by an amount corresponding to the said price.

8. An apparatus according to claim 7 comprising means to prevent the reproduction of programmes when the credit indicating member has been moved to indicate a credit-exhausted condition.

9. An apparatus according to claim 7 comprising a differential with two inputs of which one input is coupled to the motor when rotating in the credit-reducing sense but not in the price-indication establishing sense, and the other input is driven by means responsive to the subscriber's deposition of payment tokens, whereby the output of the differential is an indication of the subscriber's credit or debit.

10. An apparatus according to claim 9 wherein the motor output shaft is coupled collinearly via a one-way drive device to the said one input of the differential and carries the price-indicating member and a cam which, when the price-indicating member has been returned to zero by the said opposite sense rotation of the motor and the price indicated has been accordingly fed to the said one input, actuates a switch device whereupon the motor is stopped and programmes are permitted reproduction.

11. An apparatus according to claim 9 wherein the output of the differential is communicated to a further cam operative to switch off the programme reproducing means when the subscriber's credit is exhausted.

12. An apparatus according to claim 6 wherein the price-registering member is a debit meter caused to be driven by the motor only after the manual acceptance control has been operated to accept a programme.

References Cited

UNITED STATES PATENTS

| | | | |
|---|---|---|---|
| 3,041,389 | 6/1962 | Court | 178—5.1 |
| 3,249,689 | 5/1966 | Davis | 178—5.1 |

JOHN W. CALDWELL, *Acting Primary Examiner.*

H. W. BRITTON, *Assistant Examiner.*